US012740673B1

(12) United States Patent
Bogarin

(10) Patent No.: US 12,740,673 B1
(45) Date of Patent: Sep. 22, 2026

(54) TOILET PAPER HOLDER EXTENDER

(71) Applicant: Jose L. Bogarin, South Gate, CA (US)

(72) Inventor: Jose L. Bogarin, South Gate, CA (US)

(*) Notice: Subject to any disclaimer, the term of this patent is extended or adjusted under 35 U.S.C. 154(b) by 0 days.

(21) Appl. No.: 19/184,027

(22) Filed: Apr. 21, 2025

Related U.S. Application Data

(60) Provisional application No. 63/639,073, filed on Apr. 26, 2024.

(51) Int. Cl.
*A47K 10/22* (2006.01)
*F16M 11/10* (2006.01)
*F16M 13/02* (2006.01)
*H04M 1/04* (2006.01)

(52) U.S. Cl.
CPC ........... *A47K 10/22* (2013.01); *F16M 11/105* (2013.01); *F16M 13/022* (2013.01); *H04M 1/04* (2013.01)

(58) Field of Classification Search
USPC ........................................................ 242/597.5
See application file for complete search history.

(56) References Cited

U.S. PATENT DOCUMENTS 4,741,486 A * 5/1988 Ancona .............. A47K 10/3836 242/597.5
5,868,344 A * 2/1999 Melnick ............. A47K 10/3836 242/598.2
5,868,345 A * 2/1999 Beisser .................. A47K 10/38 242/598
5,871,170 A * 2/1999 Morales ................. A47K 10/40 242/598.2
6,405,971 B1 * 6/2002 Trecartin ............... A47K 10/38 242/598
6,527,219 B1 * 3/2003 Trecartin ............... A47K 10/38 242/598
6,761,298 B1 * 7/2004 Cantrell ............... B65H 35/002 242/596.1
6,959,890 B1 * 11/2005 Breitinger .............. A47K 10/38 242/598.5
7,306,185 B1 12/2007 Miller
11,219,340 B2 * 1/2022 Regalado Cano ..... A47K 10/40
11,529,027 B2 12/2022 Steinke
2019/0274493 A1 9/2019 Scheimberg
2025/0344911 A1 * 11/2025 Cabada .................. A47K 10/38

* cited by examiner

*Primary Examiner* — William A. Rivera
(74) *Attorney, Agent, or Firm* — John Rizvi; John Rizvi, P.A.—The Patent Professor®

(57) ABSTRACT

A toilet paper holder extender may include a base portion and a slide-out portion able to slide in and out of the base portion. The toilet paper holder extender includes a toilet paper holder to hold a toilet paper roll adjacent the toilet; and allows the toilet paper holder to be extended, enabling a user to position the toilet paper holder in a location that is more easily accessible to them. As such, the toilet paper holder extender is useful for those with mobility issues, obesity, the elderly, or the like, as it prevents individuals from having to reach to their side or out in front of them.

18 Claims, 4 Drawing Sheets

TOILET PAPER HOLDER EXTENDER

CROSS-REFERENCE TO RELATED APPLICATIONS

This application claims the benefit of U.S. Provisional Patent Application No. 63/639,073, filed on Apr. 26, 2024, which is incorporated by reference herein in its entirety.

FIELD OF THE INVENTION

The present invention generally relates to the field of bathroom accessories and more specifically relates to an extender for a toilet paper holder.

BACKGROUND OF THE INVENTION

Toilet paper is an essential hygiene product used worldwide for personal sanitation. Typically made from paper pulp, toilet paper consists of multiple layers or plies, with the most common types being single-ply and double-ply. The layers contribute to the overall strength and durability of the toilet paper, ensuring effective use without tearing or disintegration. Some premium varieties may have additional layers for enhanced softness.

The texture of toilet paper can also vary, with certain brands featuring embossing or quilting to provide a textured surface for better cleaning. Additionally, perforations along the paper enable easy tearing, allowing users to extract the desired amount conveniently. The roll itself is usually mounted on a cardboard tube, and various sizes of rolls are available to accommodate different preferences and usage needs.

The convenience of toilet paper lies in its simplicity and widespread availability, making it a fundamental and easily accessible hygiene product. Its compact and lightweight nature ensures that toilet paper can be stored and transported effortlessly, fitting seamlessly into daily routines.

The ease of tearing off just the right amount, coupled with its flushability, contribute to the overall convenience, providing a quick and effective solution for personal sanitation. The disposable nature of toilet paper eliminates the need for laundering, simplifying the post-use process.

Additionally, the wide availability of toilet paper in various sizes, ply options, and softness levels allows consumers to choose products that suit their preferences, further enhancing the convenience of this essential hygiene item in households, public spaces, and businesses worldwide.

Toilet paper holders play a crucial role in organizing and dispensing toilet paper in bathrooms, enhancing convenience and accessibility. These holders come in various designs and styles, ranging from wall-mounted fixtures to freestanding units.

Wall-mounted holders often feature a spring-loaded spindle that securely holds the toilet paper roll and allows for easy tearing along perforations. Freestanding holders, on the other hand, may have a vertical or horizontal configuration, providing flexibility in placement.

In addition, some holders include additional features such as covers or enclosures to protect the toilet paper from dust or moisture. The materials used in toilet paper holders can vary, including metal, plastic, or wood, contributing to the overall aesthetic and durability of the bathroom fixture.

Beyond their functional aspects, toilet paper holders are also considered decorative elements in bathroom design. Homeowners and interior designers often choose holders that complement the overall theme and style of the bathroom. The variety of toilet paper holder options available in the market allows individuals to personalize their bathroom spaces while ensuring that toilet paper is readily available and neatly presented for users.

However, the design of traditional toilet paper holders, which are often placed at a distance from the toilet seat, poses a significant challenge for individuals with specific health concerns or mobility issues.

For example, for those who are obese, elderly, or have spinal cord problems, reaching for toilet paper can be a cumbersome task. The need to turn to the side or stretch forward creates discomfort and can be physically demanding for individuals with limited mobility. This setup can be particularly problematic in smaller bathrooms where the spatial constraints exacerbate the issue, making it challenging for people to maintain balance and perform the necessary tasks with ease.

Accordingly, a suitable solution is desired.

SUMMARY OF THE INVENTION

The present invention is directed to a toilet paper holder extender. The toilet paper holder extender advantageously addresses the aforementioned deficiencies by providing an apparatus that enables a user to extend a toilet paper holder, making the toilet paper holder, and a thus a roll of toilet paper attached thereto, more easily accessible to the user. Thus, the aforementioned problems associated with toilet paper holders situated at awkward locations and distances are avoided.

In a first implementation of the invention, a toilet paper holder extender may comprise a base portion and a slide-out portion.

The base portion may include an elongated casing body having a base portion rear side, a substantially open base portion front side opposite the base portion rear side, a base portion top side, a base portion bottom side opposite the base portion top side, a base portion left side and a substantially open base portion right side opposite the base portion left side.

In a second aspect, the base portion front side may include an upper front panel and a lower front panel framing a front side opening.

In another aspect, the base portion right side may include a generally U or C-shaped cross-section. The shape of the base portion right side may be defined by a right side edge of each of the upper front panel and the lower front panel, thus defining a pair of base portion right side protrusions. Particularly, the pair of base portion right side protrusions may include a top downwardly extending protrusion and a bottom upwardly extending protrusion.

Between the pair of base portion right side protrusions and the base portion rear side may be a space defining a slide-out portion track.

In another aspect, the base portion may include a hollow interior which is accessed through the front side opening and the base portion right side. The hollow interior may be configured to receive the slide-out portion. In some embodiments, the base portion and the slide-out portion may both be generally rectangular in shape. However, it should be appreciated that the base portion and the slide-out portion are not limited to this particular configuration.

In another aspect, the slide-out portion may include an elongated panel having a slide-out portion front side, a slide-out portion rear side opposite the slide-out portion front side, a slide-out portion left side, a slide-out portion right side opposite the slide-out portion left side, a slide-out portion top side and a slide-out portion bottom side opposite the slide-out portion top side.

In another aspect, the slide-out portion may include a thickness, as measured from the slide-out portion rear side to the slide-out portion front side, equal or less than a width of the slide-out portion track defined between the pair of base portion right side protrusions. This thus may enable the slide-out portion to be slid in and out of the base portion via the slide-out portion track, allowing extension of a toilet paper holder attached to the slide-out portion.

In particular, the toilet paper holder may be attached to the slide-out portion front side of the slide-out portion. The toilet paper holder may, in some embodiments, include a general T-shape configuration having a first member extending outwardly from, and perpendicular to, the slide-out portion front side of the slide-out portion; and a second member attached to the second member and extending perpendicular thereto, the second member configured to receive a roll of toilet paper.

In another aspect, the slide-out portion may further include a device holder assembly configured to hold an external device, such as a cell phone.

In some embodiments, the device holder may include a bracket attached to the slide-out portion front side of the slide-out portion, a rotatable member attached to the bracket, a shaft extending from the rotatable member, and a device holder attached to the shaft.

In another aspect, the device holder may include a device holder base, a device holder rear side, a device holder front side opposite the device holder rear side and a pair of device holder sides. The device holder may include a device holder open top, opposite the device holder base, allowing a user to place their device into the device holder.

In another aspect, the slide-out portion includes a protruding member on the backside of the slide-out portion to prevent the slide-out portion from completely sliding out.

Further, in some embodiments, the device holder front side may include an elongated opening extending from the device holder open top toward the device holder base.

To install, the toilet paper holder extender may be installed onto a surface near to a toilet. For example, the toilet paper holder extender may be installed on a bathroom cabinet adjacent the toilet.

In use, a user may attach a roll of toilet paper to the toilet paper holder attached to the slide-out portion front side of the slide-out portion. When desired, the user may slide the slide-out portion to a desired position relative to the base portion, placing the toilet paper in a desired position that is easily accessible to the user. In some embodiments, the user may also place their external device, such as their cell phone, into the device holder, to temporarily hold their device.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It should be appreciated that the term "comprising" can also encompass the terms "consisting essentially of" and "consisting of."

Shown throughout the figures, the present invention is directed toward a toilet paper holder extender configured to install adjacent a toilet. The toilet paper holder extender holds a toilet paper roll adjacent the toilet and allows the toilet paper holder to be extended, enabling a user to position the toilet paper holder in a location that is more easily accessible to them. As such, the toilet paper holder extender is useful for those with mobility issues, obesity, the elderly, or the like, as it prevents individuals from having to reach to their side or out in front of them.

Figure 1:
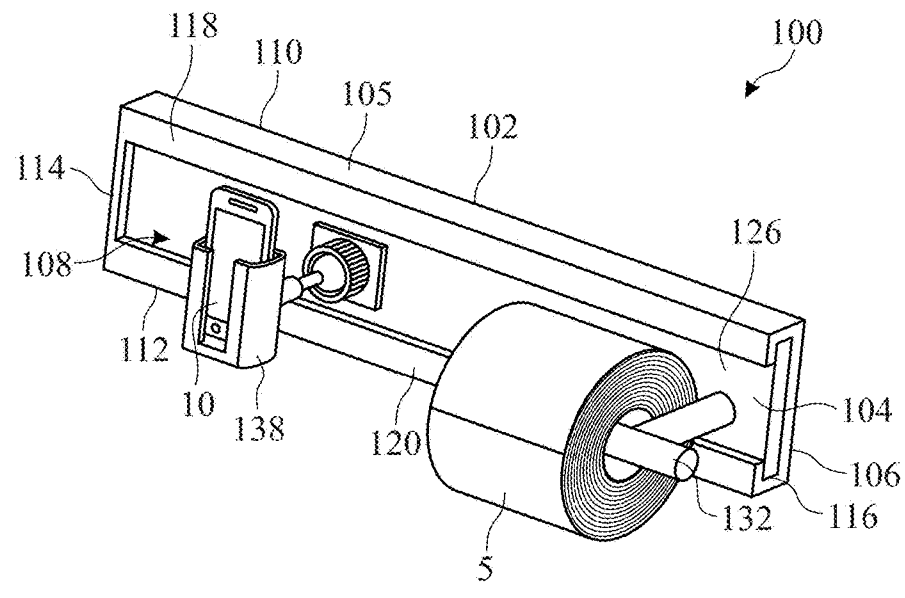
FIG. 1 presents a front perspective view of a toilet paper holder extender including a base portion and a slide-out portion, the slide-out portion including a toilet paper holder to hold a toilet paper roll, and a device holder, according to one or more embodiments of the present invention.
Figure 2:
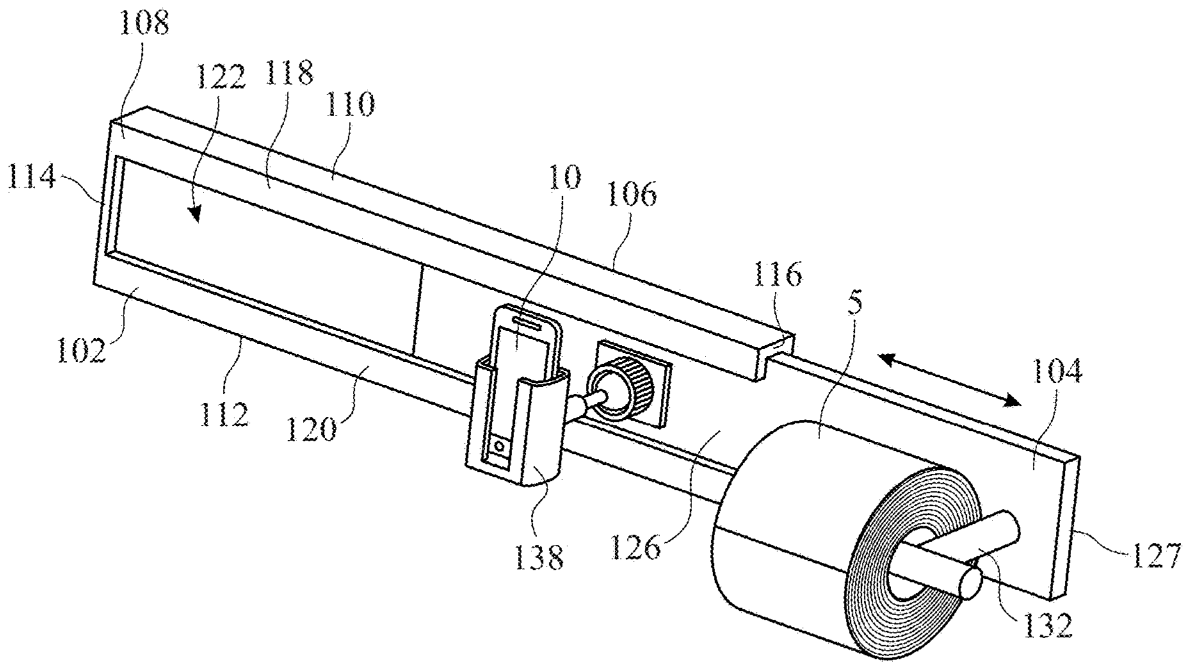
FIG. 2 presents a front perspective view of the toilet paper holder extender illustrating the slide-out portion being partially slid out from the base portion, according to one or more embodiments of the present invention.

Referring initially to FIGS. 1-2, there are shown two front perspective views of a toilet paper holder extender 100. As shown here, the toilet paper holder extender 100 may be made up of two main components: a base portion 102 and a slide-out portion 104. In some embodiments, both the base portion 102 and the slide-out portion 104 may include a generally rectangular configuration. However, it should be appreciated that the base portion 102 and the slide-out portion 104 are not limited to this configuration.

Further, in some embodiments, the toilet paper holder extender 100 may be made from a plastic material, such as polyvinyl chloride (PVC); however, it should be appreciated that the toilet paper holder extender 100 is not limited to this material.

As shown here, the base portion 102 may include an elongated casing body 105 configured to receive the slide-out portion 104. In particular, as demonstrated in FIG. 2, the slide-out portion 104 may be configured to slide in and out of the base portion 102 to hold a toilet paper roll 5 attached thereto at a desired position relative to a user of the toilet paper holder extender 100, so as to make the toilet paper roll 5 more easily accessible to the user.

As shown here, the slide-out portion 104 may be configured to insert into the base portion 102 such that the longitudinal axis' of both the slide-out portion 104 and the base portion 102 are aligned, or at least parallel.

The elongated casing body 105 may include a base portion rear side 106, a substantially open base portion front side 108 opposite the base portion rear side 106, a base portion top side 110, a base portion bottom side 112 opposite the base portion top side 110, a base portion left side 114 and a substantially open base portion right side 116 opposite the base portion left side 114.

The base portion front side 108 may further include an upper front panel 118 and a lower front panel 120 framing a front side opening 122. In addition, the base portion 102 may include a hollow interior which is accessed through the front side opening 122 and the base portion right side 116. The hollow interior may be configured to receive the slide-out portion 104.

As above, the toilet paper holder extender 100 is used to particularly allow a user to adjust positioning of a toilet paper roll 5 relative to them. As such, as shown in these figures, the toilet paper holder extender 100 may further include a toilet paper holder 132 configured to hold a toilet paper roll 5. In particular, the toilet paper holder 132 may be attached to the slide-out portion front side 126 of the slide-out portion 104, as shown here.

Further, in some embodiments, the toilet paper holder extender 100 may include a device holder assembly 138. Particularly, the device holder assembly 138 may be attached to the slide-out portion front side 126 of the slide-out portion 104. The device holder assembly 138 may be configured to hold an external device 10, such as a cell phone, as shown here.

Figure 3:
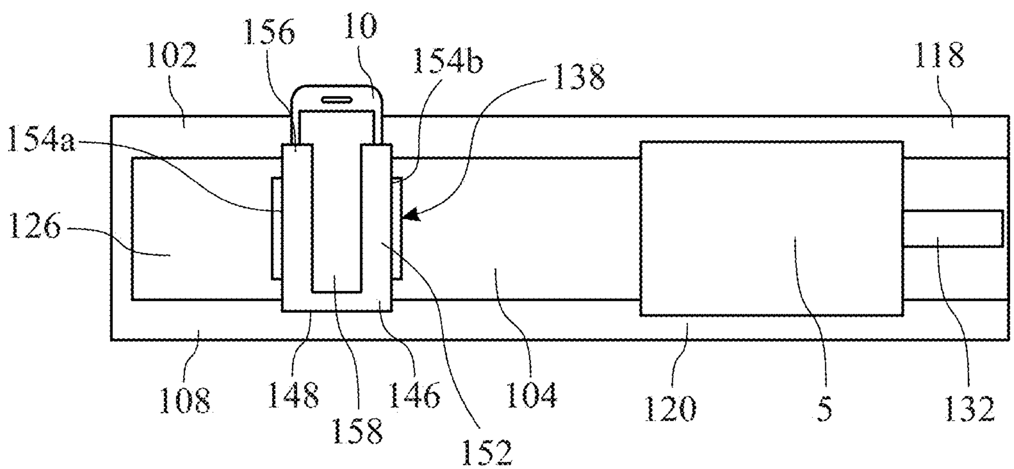
FIG. 3 presents a front view of the toilet paper holder extender, according to one or more embodiments of the present invention.
Figure 4:
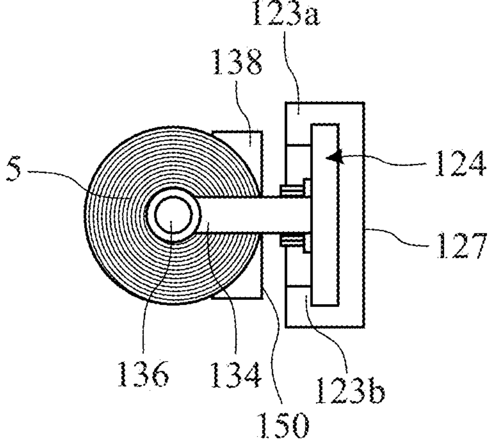
FIG. 4 presents a side view of the toilet paper holder extender, according to one or more embodiments of the present invention.

Referring now to FIGS. 3-4, there is shown a front view of the toilet paper holder extender 100 (FIG. 3) and a side view of the toilet paper holder extender 100 (FIG. 4). FIG. 3 demonstrates the slide-out portion 104 slid completely into the base portion 102. Again, on the slide-out portion front side 126 of the slide-out portion 104, there is attached the device holder assembly 138 and the toilet paper holder 132 configured to hold the toilet paper roll 5.

As shown here, the device holder assembly 138 may include a device holder 146, again, configured to hold the external device 10 (such as a cell phone). As shown here, the device holder 146 may include a device holder base 148, a device holder rear side 150, a device holder front side 152 opposite the device holder rear side 150 and a pair of device holder sides 154 *a*, 154 *b*. The device holder 146 may include a device holder open top 156, opposite the device holder base 148, allowing a user to place their device into the device holder 146.

Further, in some embodiments, the device holder front side 152 may include an elongated opening 158 extending from the device holder open top 156 toward the device holder base 148.

Moving more specifically to FIG. 4, showing a side view of the toilet paper holder extender 100. Again, shown here is the toilet paper holder 132. As shown here, in some embodiments, the toilet paper holder 132 may include a first member 134 extending from the slide-out portion front side 126 of the slide-out portion 104 and a second member 136 extending from the first member 134 and configured to hold the toilet paper roll 5.

Further, shown here is the base portion right side 116 of the base portion 102. As shown here, the base portion right side 116 may include a generally U or C-shaped cross-section. The shape of the base portion right side 116 may be defined by a right side edge of each of the upper front panel 118 and the lower front panel 120 (FIG. 3), thus defining a pair of base portion right side protrusions 123 *a*, 123 *b*. Particularly, the pair of base portion right side protrusions 123 *a*, 123 *b* may include a top downwardly extending protrusion 123 *a* and a bottom upwardly extending protrusion 123 *b*.

Figure 5:
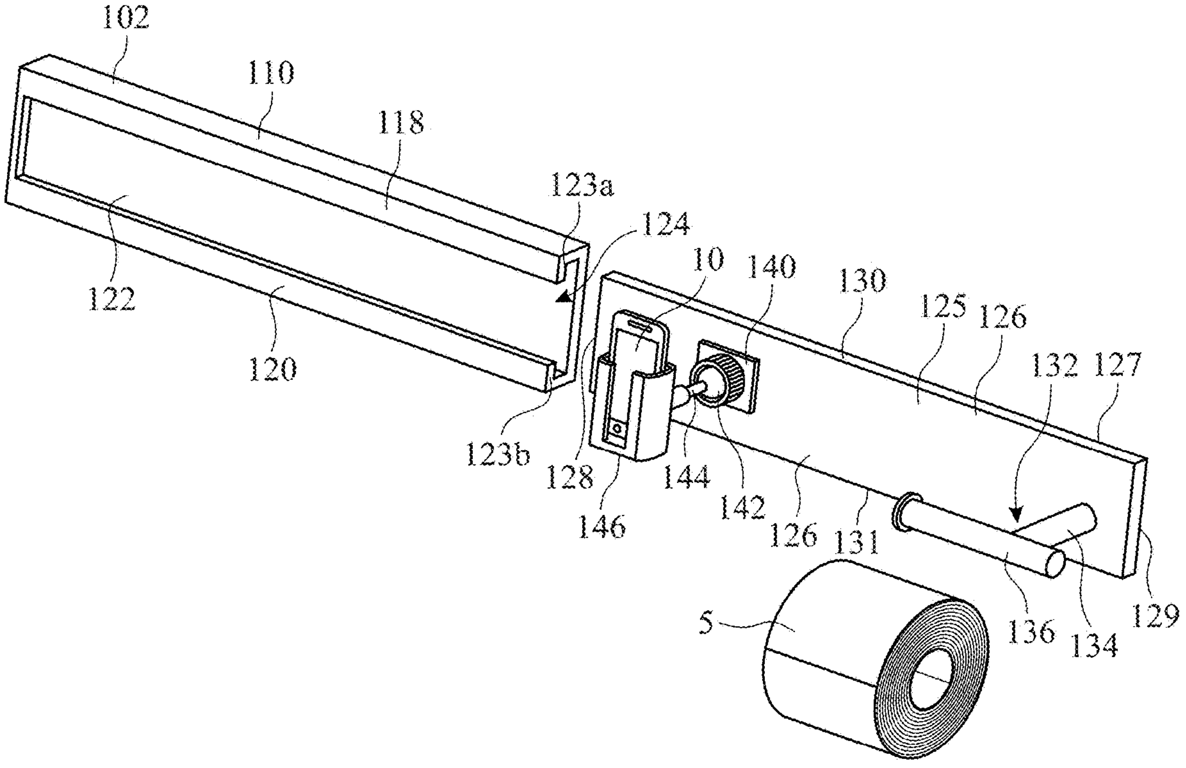
FIG. 5 presents a perspective partially exploded view of the toilet paper holder extender, illustrating the slide-out portion removed from the base portion and the toilet paper roll removed from the toilet paper holder, according to one or more embodiments of the present invention.

Referring also now to FIG. 5, with reference still to FIGS. 3-4, there is shown a partially exploded view of the toilet paper holder extender 100. As shown here, between the pair of base portion right side protrusions 123 *a*, 123 *b* and the base portion rear side 106 may be a space defining a slide-out portion track 124. This slide-out portion track 124 may enable the slide-out portion 104 to easily slide in and out of the base portion 102.

As shown in FIGS. 4-5, the slide-out portion 104 may include an elongated panel 125 having a slide-out portion front side 126, a slide-out portion rear side 127 opposite the slide-out portion front side 126, a slide-out portion left side 128, a slide-out portion right side 129 opposite the slide-out portion left side 128, a slide-out portion top side 130 and a slide-out portion bottom side 131 opposite the slide-out portion top side 130.

The slide-out portion 104 may include a thickness, as measured from the slide-out portion rear side 127 to the slide-out portion front side 126, equal or less than a width of the slide-out portion track 124 defined between the pair of base portion right side protrusions 123 *a*, 123 *b*. This thus may enable the slide-out portion 104 to be slid in and out of the base portion 102 via the slide-out portion track 124, allowing extension of the toilet paper holder 132 attached to the slide-out portion 104.

As above, the toilet paper holder 132 may include the first member 134 and the second member 136. In particular, in some embodiments, the toilet paper holder 132 may include a general T-shape configuration having the first member 134 extending outwardly from, and perpendicular to, the slide-out portion front side 126 of the slide-out portion 104; and the second member 136 attached to the second member 136 and extending perpendicular thereto. As demonstrated in FIG. 4, the second member 136 may be configured to receive toilet paper roll 5.

Further, as shown here and as discussed above, the device holder assembly 138 may be attached to the slide-out portion front side 126 of the slide-out portion 104. Particularly, the device holder assembly 138 may include a bracket 140 attached to the slide-out portion front side 126 of the slide-out portion 104. The bracket 140 may, in some embodiments, include a square member mounted to the slide-out portion front side 126 of the slide-out portion 104.

A rotatable member 142 may be attached to the bracket 140 and may extend outwardly therefrom. This rotatable member 142 may enable rotation of the device holder 146, and thus the external device 10 located therein. As such, the user may be able to easily rotate the external device 10 from a portrait configuration to a landscape configuration.

As also shown here, a shaft 144 may extend outwardly from the rotatable member 142, perpendicular to the longitudinal axis of the slide-out portion 104; and the device holder 146 may be attached to the shaft 144.

Figure 6:
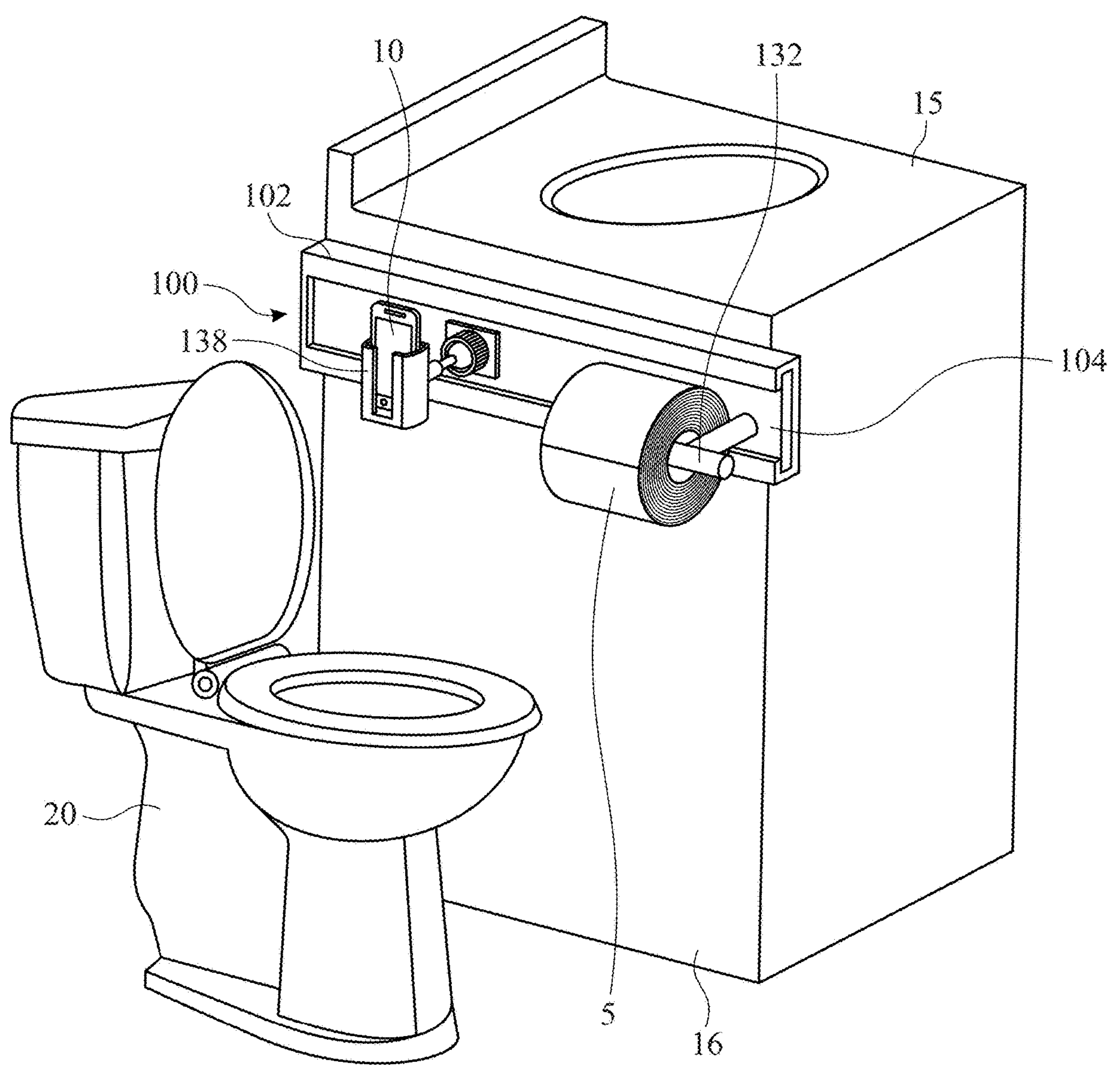
FIG. 6 presents a perspective view of the toilet paper holder extender installed on a bathroom cabinet adjacent a toilet, according to one or more embodiments of the present invention.

Referring now more specifically to FIG. 6, there is shown a perspective view of the toilet paper holder extender 100 having been installed. Particularly, the toilet paper holder extender 100 is shown here having been installed onto a wall 16 of a bathroom cabinet 15, adjacent a toilet 20; thus, enabling easy access to the toilet paper roll 5 attached to the toilet paper holder extender 100.

As discussed above, the toilet paper holder extender 100 may include the toilet paper holder 132 to hold the toilet paper roll 5, enabling a user of the toilet 20 to slide the slide-out portion 104 from the base portion 102 and place the toilet paper roll 5 into a desired position such that the toilet paper roll 5 is easily accessible to the user of the toilet 20, without having to reach excessively to their side or out in front of them.

Further, as shown here and as discussed above, the device holder assembly 138 is attached to the slide-out portion 104 of the toilet paper holder extender 100 and is used to hold an external device 10, such as a cell phone, adjacent the user. This may provide a place for the user to sit their external device 10 down during use of the toilet 20, and also may enable the user to utilize their external device 10 during use of the toilet 20.

In use, a user may attach a roll of toilet 20 paper to the toilet paper holder 132 attached to the slide-out portion front side 126 of the slide-out portion 104. When desired, the user may slide the slide-out portion 104 to a desired position relative to the base portion 102, placing the toilet 20 paper in a desired position that is easily accessible to the user. In some embodiments, the user may also place their external device 10, such as their cell phone, into the device holder 146, to temporarily hold their external device 10.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A toilet paper holder extender, said toilet paper holder extender comprising, a base portion;

a slide-out portion;

wherein said slide-out portion is configured to slide in and out of said base portion; and wherein the slide-out portion further comprises a device holder assembly configured to hold an external device, the device holder assembly comprising a bracket attached to a slide-out portion front side of the slide-out portion, a rotatable member attached to the bracket, a shaft extending from the rotatable member, and a device holder attached to the shaft.

2. The toilet paper holder extender of claim 1, wherein the base portion comprises an elongated casing body having a base portion rear side, a substantially open base portion front side opposite the base portion rear side, a base portion top side, a base portion bottom side opposite the base portion top side, a base portion left side, and a substantially open base portion right side opposite the base portion left side.

3. The toilet paper holder extender of claim 2, wherein the base portion front side comprises an upper front panel and a lower front panel framing a front side opening.

4. The toilet paper holder extender of claim 3, wherein the base portion right side comprises a U or C-shaped cross-section.

5. The toilet paper holder extender of claim 4, wherein the shape of the base portion right side is defined by a right side edge of each of the upper front panel and the lower front panel, thus defining a pair of base portion right side protrusions.

6. The toilet paper holder extender of claim 5, wherein the pair of base portion right side protrusions comprises a top downwardly extending protrusion and a bottom upwardly extending protrusion.

7. The toilet paper holder extender of claim 6, further comprises a space defining a slide-out portion track between the pair of base portion right side protrusions and the base portion rear side.

8. The toilet paper holder extender of claim 3, wherein the base portion comprises a hollow interior which is accessed through the front side opening and the base portion right side, and wherein the hollow interior is configured to receive the slide-out portion.

9. The toilet paper holder extender of claim 1, wherein the base portion and the slide-out portion are rectangular in shape.

10. The toilet paper holder extender of claim 1, wherein the slide-out portion comprises an elongated panel having a slide-out portion front side, a slide-out portion rear side opposite the slide-out portion front side, a slide-out portion left side, a slide-out portion right side opposite the slide-out portion left side, a slide-out portion top side and a slide-out portion bottom side opposite the slide-out portion top side.

11. The toilet paper holder extender of claim 10, wherein the slide-out portion comprises a thickness, as measured from the slide-out portion rear side to the slide-out portion front side, equal or less than a width of a slide-out portion track defined between a pair of base portion right side protrusions, which thus enable the slide-out portion to be slid in and out of the base portion via a slide-out portion track, allowing extension of a toilet paper holder attached to the slide-out portion.

12. The toilet paper holder extender of claim 11, wherein the toilet paper holder is attached to the slide-out portion front side of the slide-out portion.

13. The toilet paper holder extender of claim 12, wherein the toilet paper holder comprises a general T-shape configuration having a first member extending outwardly from, and perpendicular to, the slide-out portion front side of the slide-out portion, and a second member attached to the first member and extending perpendicular thereto, the second member configured to receive a roll of toilet paper.

14. The toilet paper holder extender of claim 1, wherein the device holder assembly is configured to hold a cell phone.

15. The toilet paper holder extender of claim 1, wherein the device holder comprises a device holder base, a device holder rear side, a device holder front side opposite the device holder rear side and a pair of device holder sides, and wherein the device holder further comprises a device holder open top, opposite the device holder base, allowing a user to place an external device into the device holder.

16. The toilet paper holder extender of claim 15, wherein the device holder front side comprises an elongated opening extending from the device holder open top toward the device holder base.

17. The toilet paper holder extender of claim 1, wherein the slide-out portion comprises a protruding member on a backside of the slide-out portion to prevent the slide-out portion from completely sliding out.

18. The toilet paper holder extender of claim 1, wherein the toilet paper holder extender comprises polyvinyl chloride (PVC).

* * * * *